US007344442B2

(12) United States Patent
Inoue

(10) Patent No.: US 7,344,442 B2
(45) Date of Patent: Mar. 18, 2008

(54) SYMBOL DISPLAY DEVICE FOR GAME MACHINE

(75) Inventor: Haruo Inoue, Tokyo (JP)

(73) Assignee: DRAGON Co., Ltd., Tokyo (JP)

( * ) Notice: Subject to any disclaimer, the term of this patent is extended or adjusted under 35 U.S.C. 154(b) by 518 days.

(21) Appl. No.: 10/940,784

(22) Filed: Sep. 15, 2004

(65) Prior Publication Data

US 2005/0277460 A1 Dec. 15, 2005

(30) Foreign Application Priority Data

May 31, 2004 (JP) ............................ 2004-161931

(51) Int. Cl.
*A63F 13/00* (2006.01)

(52) U.S. Cl. .................................... 463/20; 273/143 R

(58) Field of Classification Search .................. 463/20, 463/21, 22, 16; 273/143 R, 142 R, 138.1, 273/138.2, 142 J See application file for complete search history.

(56) References Cited

U.S. PATENT DOCUMENTS

| | | | | |
|---|---|---|---|---|
| 4,711,452 | A * | 12/1987 | Dickinson et al. | 273/143 R |
| 5,152,529 | A * | 10/1992 | Okada | 463/20 |
| 5,388,829 | A * | 2/1995 | Holmes | 273/143 R |
| 5,395,111 | A * | 3/1995 | Inoue | 273/143 R |
| 5,580,055 | A * | 12/1996 | Hagiwara | 273/143 R |
| 5,683,296 | A * | 11/1997 | Rasmussen | 463/20 |
| 5,688,172 | A * | 11/1997 | Lorenzo Regidor | 463/20 |
| 5,722,891 | A * | 3/1998 | Inoue | 463/20 |
| 5,752,881 | A * | 5/1998 | Inoue | 463/20 |
| 6,027,115 | A * | 2/2000 | Griswold et al. | 273/143 R |
| 6,102,396 | A * | 8/2000 | Liu | 273/143 R |
| 6,129,355 | A * | 10/2000 | Hahn et al. | 273/142 R |
| 6,206,781 | B1 * | 3/2001 | Sunaga et al. | 463/20 |
| 6,270,408 | B1 * | 8/2001 | Sakamoto et al. | 463/20 |
| 6,802,507 | B2 * | 10/2004 | Inoue | 273/143 R |
| 6,923,441 | B2 * | 8/2005 | Inoue | 273/143 R |
| 6,926,606 | B2 * | 8/2005 | Onuki et al. | 463/20 |
| 6,988,731 | B2 * | 1/2006 | Inoue | 273/142 H |
| 7,169,048 | B2 * | 1/2007 | Nozaki et al. | 463/30 |
| 2004/0038726 | A1 * | 2/2004 | Inoue | 463/20 |
| 2005/0043084 | A1 * | 2/2005 | Inoue | 463/20 |
| 2006/0052155 | A1 * | 3/2006 | Inoue | 463/20 |

FOREIGN PATENT DOCUMENTS

| | | | |
|---|---|---|---|
| JP | 2000061027 | A * | 2/2000 |
| JP | 2002-126229 | | 5/2002 |

* cited by examiner

*Primary Examiner*—John Hotaling
*Assistant Examiner*—Damon Pierce
(74) *Attorney, Agent, or Firm*—Young & Thompson

(57) ABSTRACT

A symbol display device is provided with a first reel unit, a second reel unit, and a third reel unit. Each of the first, the second, and the third reel unit is composed as a double reel structure with an inner reel and an outer reel. The inner reel and the outer reel are formed out of light-transmittable material and have translucent symbols arranged on their peripheries. A first light-emitting device is provided inside the inner reel to illuminate the symbols on the inner reel from behind of them and a second light-emitting device is provided between the inner reel and the outer reel to illuminate the symbols on the outer reel from behind of them. In order to illuminate the symbols on the outer reel, only the second light-emitting device is lit up, while the first light-emitting device is lit up in order to illuminate only the symbols on the inner reel.

13 Claims, 12 Drawing Sheets

SYMBOL DISPLAY DEVICE FOR GAME MACHINE

BACKGROUND OF THE INVENTION

1. Field of the Invention

The present invention relates to a symbol display device for a game machine, mounted in game machines such as a slot machine and a Pachinko game machine.

2. Background Arts

For game machines such as a slot machine and a Pachinko game machine, it is popular to mount symbol display devices in the game machines recently. In the slot machine, for example, the symbol display device is controlled to start moving symbols with displaying them when a start button is pressed or a start lever is operated after coins are inserted. Then, when a stop button is operated or after a predetermined duration, the symbols are stopped and displayed. Whether the win or the loss and a type of the win are judged from a combination of the symbols displayed on a prize-winning line. If it is judged to generate the win, dividend coins are dispensed.

There are symbol display devices of mechanical reel type and an electronic display type such as a liquid crystal display. In the symbol display device of mechanical reel type, a plurality of reels, provided with a plurality of symbols on the peripheries thereof, are disposed horizontally. Each reel is rotated by a motor for displaying the symbols through a display window provided in front of the reels. When the reels are stopped from rotating, whether the win or the loss is judged from the combination of displayed symbols. In order to improve visibility for the symbols stopped behind the display window of symbol display device of mechanical reel type, light-emitting devices are provided inside the reels to illuminate the symbols from behind of them.

Since the number of symbols to be provided on a single reel is limited in the symbol display device of mechanical reel type, it is difficult to provide a variety of contents for a game. In order to deal with this problem, a variety of symbol display devices having reel units composed of outer reels and inner reels rotating within the outer reels have been disclosed.

For example, Japanese Patent Laid-Open Publication Number 2002-126229 discloses a double drum (reel assembly) composed of an inner drum (reel) and an outer drum (reel), which are rotated by individual driving motors, having symbols on the peripheries thereof. Since the inner drum and the outer drum have the same symbols thereon and the symbols on the outer drum are formed to be either transparent or translucent, the symbols on the inner drum are observable through the symbols on the outer drum. Thus the symbols on the inner drum and on the outer drum overlap with each other to appear in three dimensions. In addition, light-emitting devices are provided inside the inner drums to illuminate the symbols on both the inner drums and the outer drums from their behind in order to improve the visibility for the symbols.

Such a symbol display device, however, has the following problems: first, the visibility for the symbols become deteriorated when the light-emitting devices inside the inner drums are lit up, for the shapes and the colors of the symbols on the inner drums are reflected on the symbols on the outer drums. Secondly, the game does not have diversified contents even with the double drum, since the double drum may not have more kinds of symbols than a single drum, as the symbols on the inner drum and on the outer drum are identical. Furthermore, as the light-emitting devices have no light guiding means, the light from the light-emitting devices may not be efficiently guided to the symbols so as to clearly display the symbols.

SUMMARY OF THE INVENTION

A main object of the present invention is to provide a symbol display device in which the symbols on the outer reels may be clearly observable, as the shapes and the colors of the symbols on the inner reels may not reflect on the symbols on the outer reels. The other object of the present invention is to diversify the contents of a game by increasing the kinds of the symbols to be displayed. Still other object of the present invention is to clearly display the symbols by efficiently guiding the light emitted from the light-emitting device.

In order to achieve the above objects, a symbol display device for a game machine, in which whether the win or the loss is judged from a combination of the symbols stopped on a winning line crossing a display window, is provided with a plurality of reel units disposed with crossing the winning lines and having at least one reel unit of a double reel unit including an inner reel and an outer reel, which have transmittance at least in part and are rotatable independently from each other, a plurality of inner symbols provided on the periphery of the inner reel and displayed through the display window via at least one part of the periphery of the outer reel, a plurality of outer symbols provided on the periphery of the outer reel, a first light-emitting device disposed the inside of the inner reel for illuminating the inner symbols, and a second light-emitting device disposed between the inside of the outer reel and the outside of the inner reel for illuminating the outer symbols, according to the present invention.

According to the symbol display device for the game machine of the present invention, the symbols on the inner reel are prevented from being reflected onto the symbols on the outer reel when the symbols on the outer reel are displayed. In addition, the contents of the game are diversified by increasing the kinds of the symbols to be displayed. Furthermore, the symbols may be displayed clearly, as the light from the light-emitting devices is efficiently guided to the symbols.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
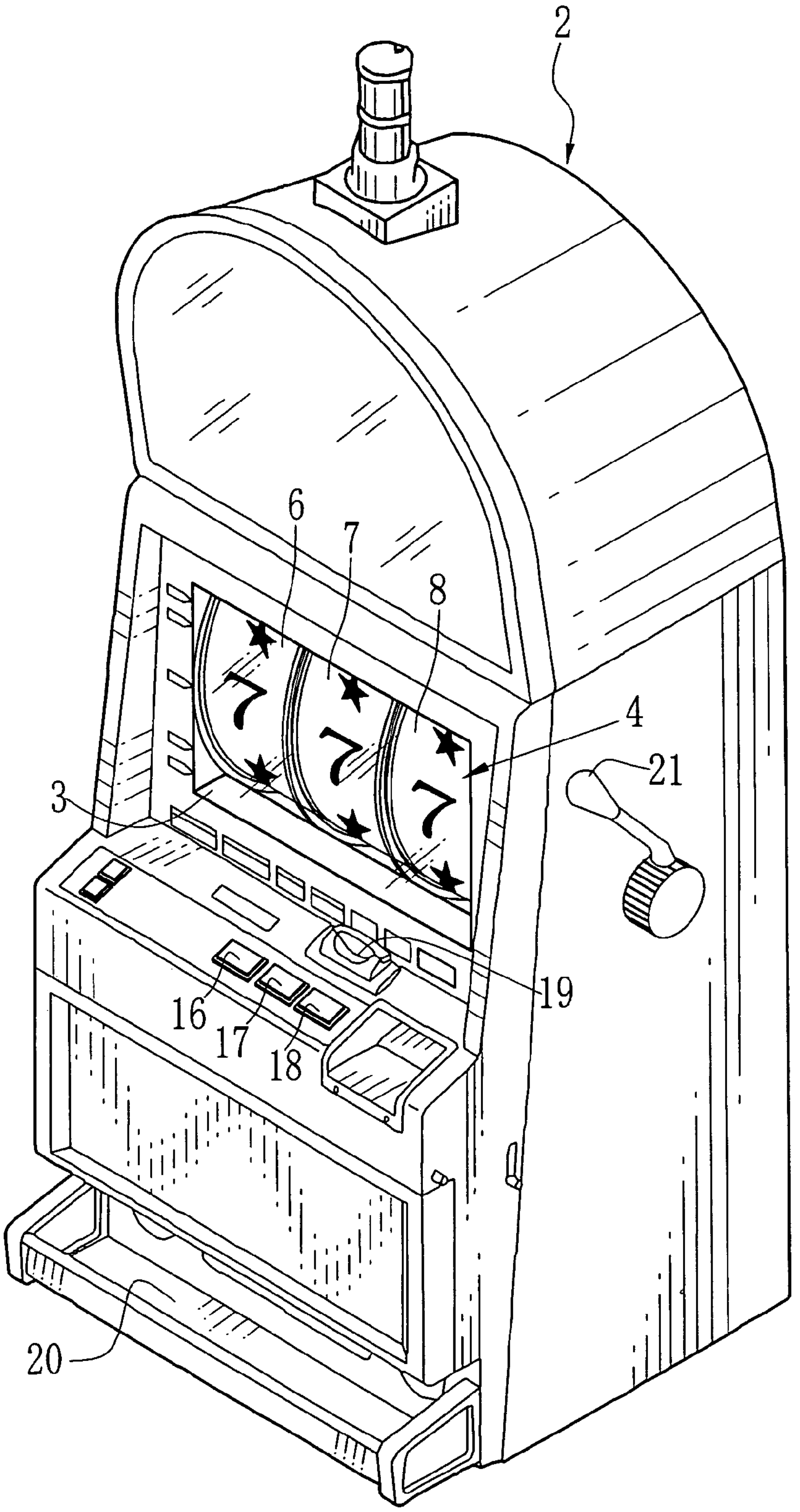
FIG. 1 is a perspective view illustrating an exterior of a slot machine embodying the present invention.

FIG. 1 is a perspective view illustrating an exterior of a slot machine having a symbol display device for a game machine (hereinafter referred to as a symbol display device) of the present invention. A display window 3 is provided in the center of the front side of a slot machine 2. A first reel unit 6, a second reel unit 7, and a third reel unit 8, which compose the symbol display device 4 of the mechanical reel type, are observable through the display window 3. A 1-bet button 16, a max bet button 17, a payout button 18, and a coin slot 19 are provided beneath the display window 3.

Figure 2:
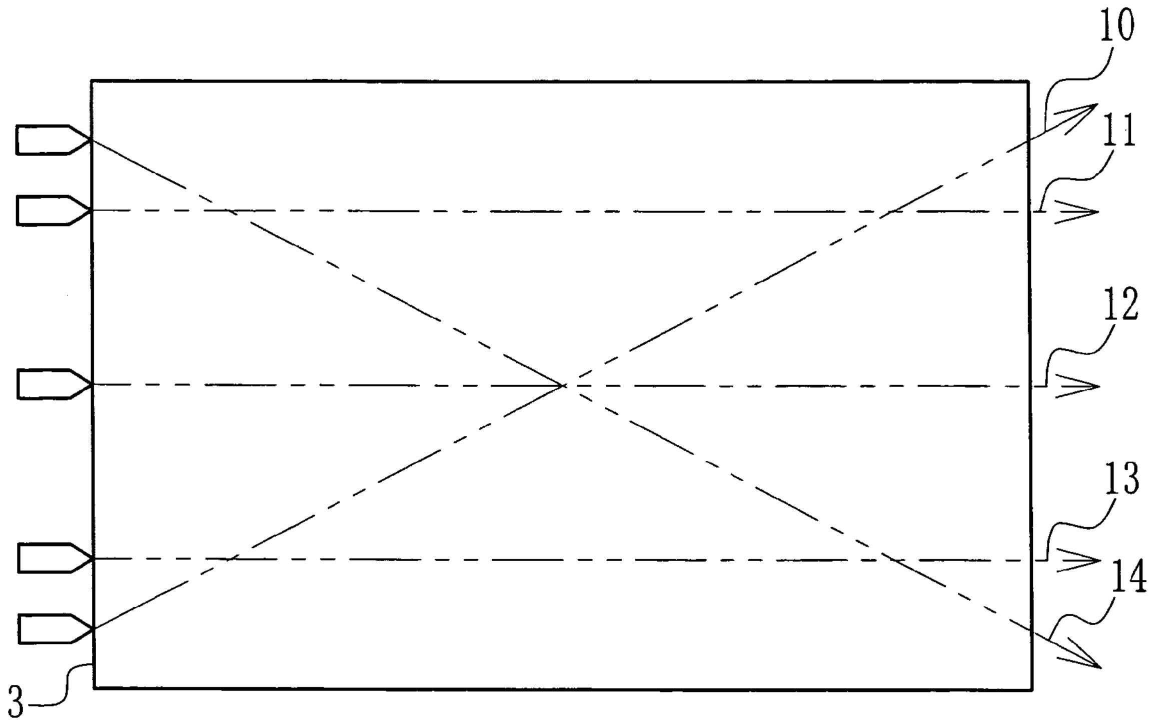
FIG. 2 is an explanatory view illustrating prize-winning lines.

As shown in FIG. 2, the display window 3 is provided with five prize-winning lines 10-14 composed of three horizontal lines and two slant lines. Betting is executed by inserting coins via the coin slot 19 and pressing the 1-bet button 16 or the max bet button 17. When betting is completed, the prize-winning lines 10-14 are validated. The number of the prize-winning lines 10-14 to be validated depends on the number of inserted coins. Note that betting is executed not only by actually inserting coins via the coin slot 19 and pressing the 1-bet button 16 or the max bet button 17 but also by consuming accounts counted by a credit counter (not shown) and pressing the 1-bet button 16 or the max bet button 17. Also, medals and tokens may be used instead of coins in the present embodiment.

When the start lever 21, provided on the side face of the slot machine 2, is operated after betting, the first, the second, and the third reel unit 6-8 start rotating. Whether the win or the loss is judged from combinations of the symbols stopped on the valid prize-winning lines and displayed in the display window 3 when all of the first, the second, and the third reel units 6-8 stop after a predetermined duration. If it is judged to generate the win, dividend coins are dispensed in the coin tray 20. The number of dividend coins is predetermined according to the type of the win.

Each of the first, the second, and the third reel units 6-8 has double reels composed of an inner reel 25 and an outer reel 26. Since all of the first, the second, and the third reel units 6-8 have the same compositions, the first reel unit 6 is used as an example in the following explanation.

Figure 3:
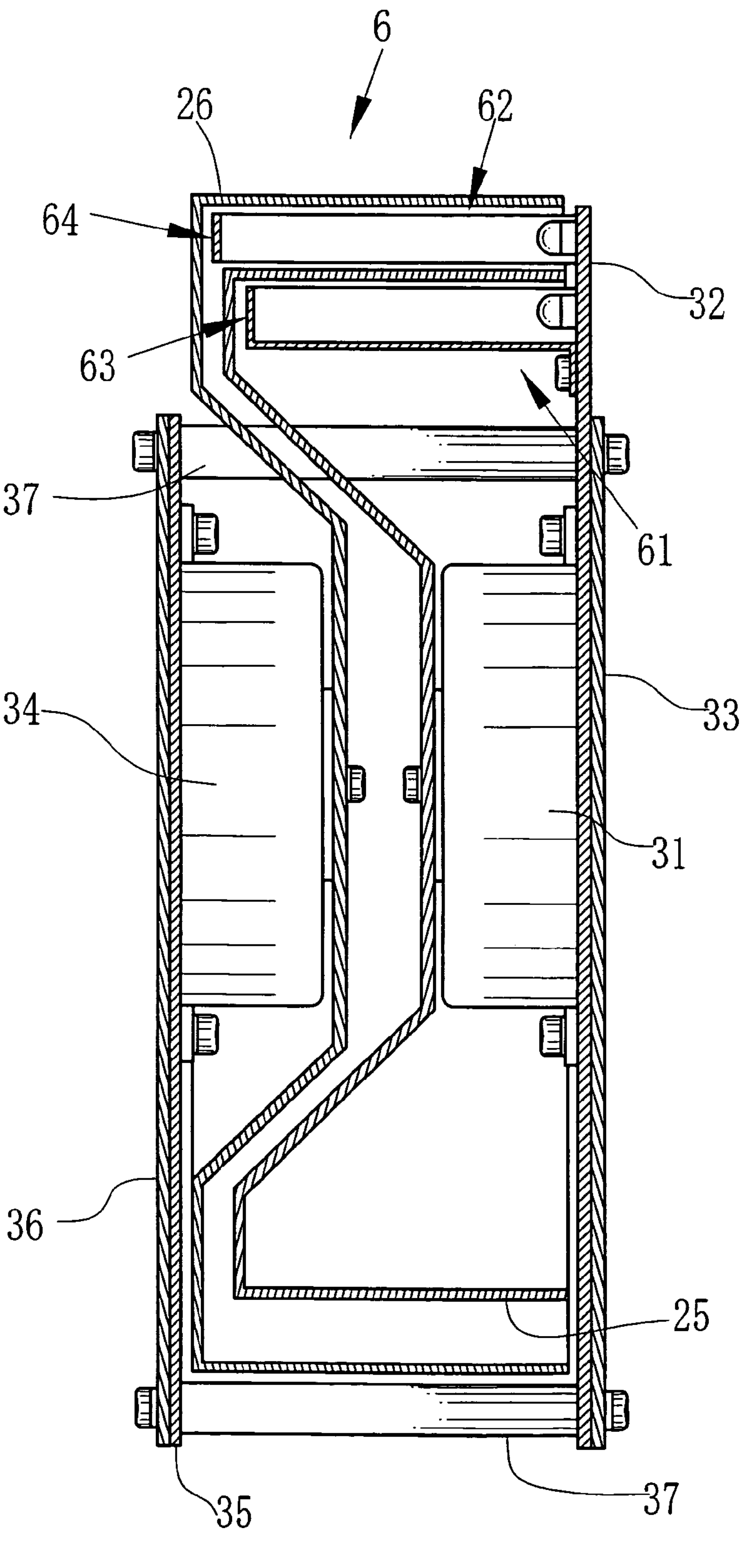
FIG. 3 is a cross-sectional view illustrating a composition of a first reel unit.
Figure 4:
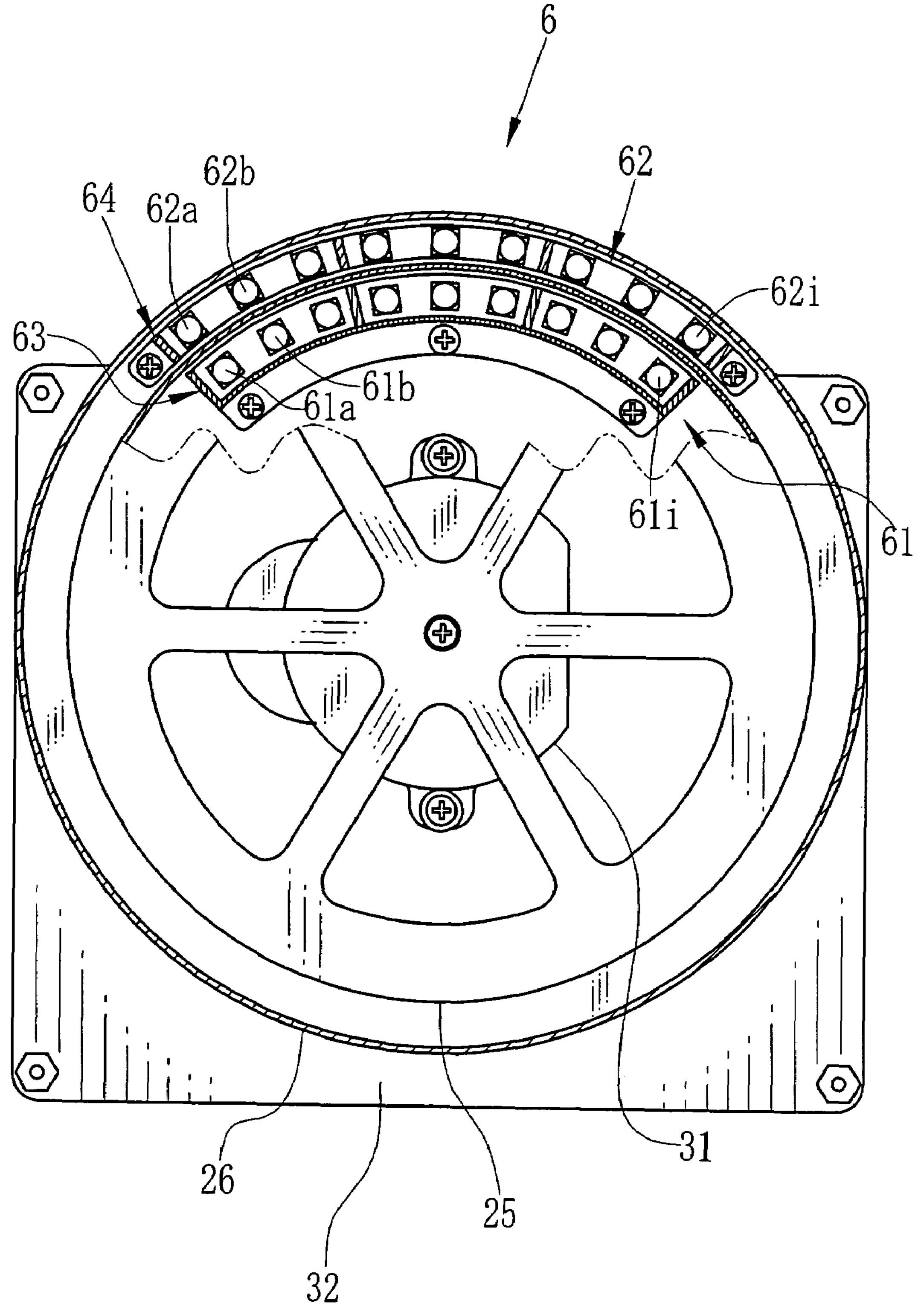
FIG. 4 is a cross-sectional view illustrating a composition of the first reel unit.

As shown in FIG. 3 and FIG. 4, the first reel unit 6 is provided with the inner reel 25, a stepping motor 31 for rotating the inner reel 25, an inner reel board 32 for supporting the stepping motor 31, an inner reel mounting plate 33 for mounting the inner reel board 32 thereon, the outer reel 26, a stepping motor 34 for rotating the outer reel 26, an outer reel board 35 for supporting the stepping motor 34, and an outer reel mounting plate 36 for mounting the outer reel board 35 thereon. Output shafts of the stepping motors 31 and 34 are on the same axis, and to which the inner reel 25 and the outer reel 26 are connected respectively for rotating concentrically with each of the output shafts. The inner reel mounting plate 33 and the outer reel mounting plate 36 are secured to each other by means of 4 connecting metals 37.

Figure 5:
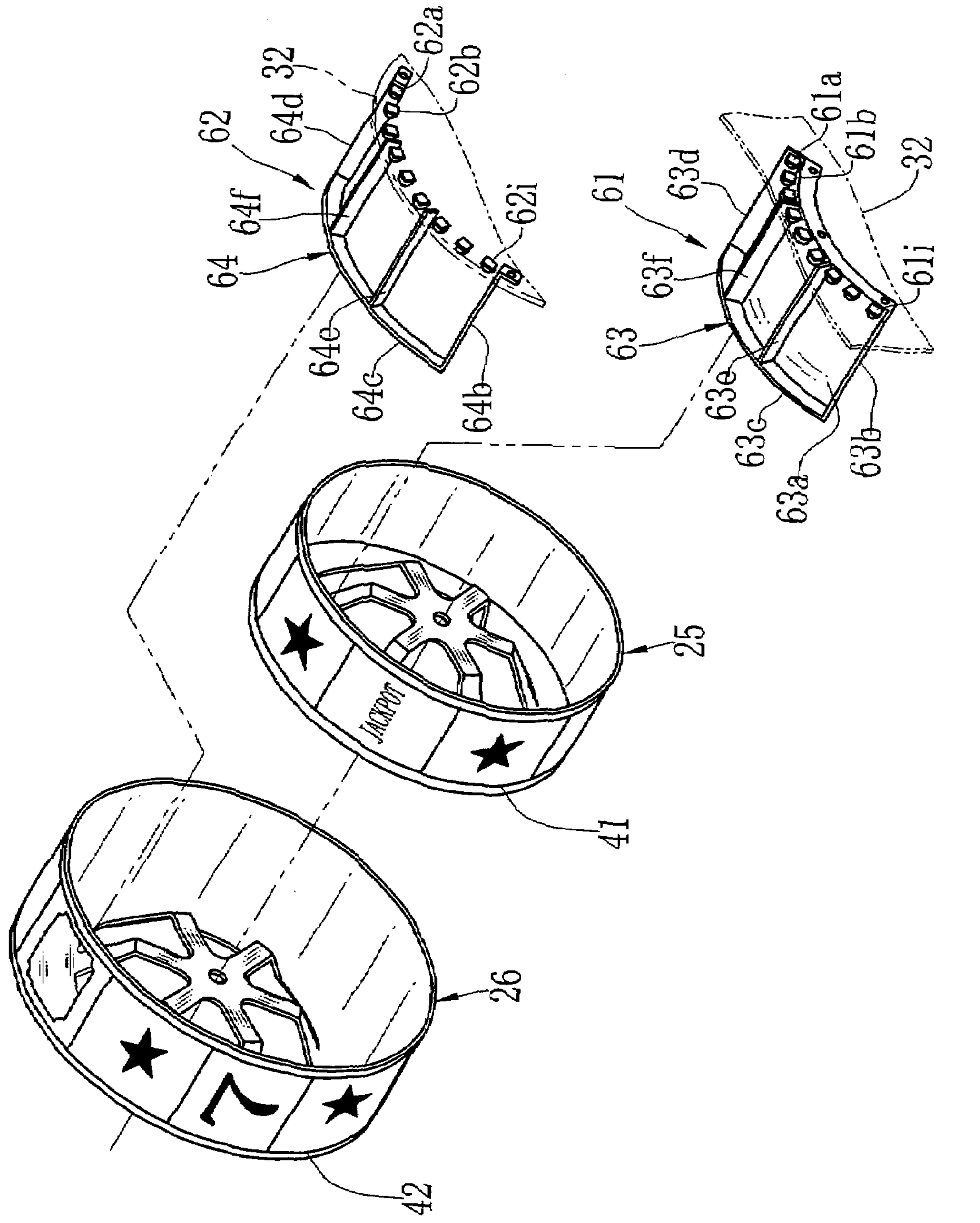
FIG. 5 is a perspective view illustrating compositions of an inner reel and an outer reel.

As shown in FIG. 5, the inner reel 25 and the outer reel 26 are formed out of translucent plastic material such as light-transmittable plastic. The peripheries of the inner reel 25 and the outer reel 26 are respectively wound with symbol sheets 41 and 42 having a plurality of symbols printed thereon.

Figure 6A:
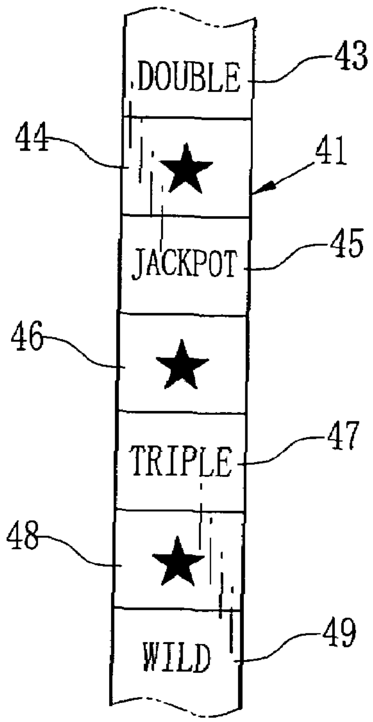
FIG. 6A and FIG. 6B are plane views illustrating compositions of symbol sheets attached to the inner reel and the outer reel.

The symbol sheet 41, as shown in FIG. 6(A), has symbols such as a "DOUBLE" 43, a star 44, a "JACKPOT" 45, a star 46, a "TRIPLE" 47, a star 48, and a "WILD" 49 printed thereon and the entire symbol sheet 41 is formed to be translucent.

Figure 6B:
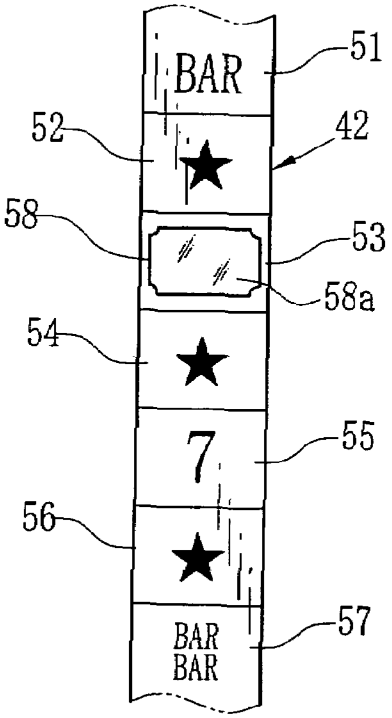

As shown in FIG. 6(B), the symbol sheet 42 has symbols such as a "BAR" 51, a star 52, a symbol transmission window 53, a star 54, a "7" 55, a star 56, and a "BAR BAR" 57 printed thereon. A framing line 58 is printed on the symbol transmission window 53. The inside of the framing line 58 is a window area 58*a* formed to be transparent and lightly colored (with yellow, for example). Since the entire symbol sheet 42 is formed to be translucent except for the window area 58*a* and having less transmittance than the window area 58*a*, the symbols on the inner reel 25 is not observable while the outer reel is rotating, except when the symbol transmission window 53 on the outer reel is displayed through the display window 3.

The inner reel board 32 is provided with a first light-emitting device 61 and a second light-emitting device 62, which are backlights for illuminating the symbols on the inner reel 25 and the outer reel 26 from behind of them and are disposed between the display window 3 of the symbols display device 4 and the rotary shafts of the inner reel 25 and the outer reel 26.

The first light-emitting device 61 is provided with nine lamps 61*a*-61*i*, which emit white light. The lamps 61*a*-61*i* are arranged in an arc along the inner circumference of the inner reel 25 and mounted on the inner reel board 32 to be disposed the inside of the inner reel 25. The first light-emitting device 61 is also provided with a first reflecting part 63 for reflecting the light emitted from the lamps 61*a*-61*i* toward the symbols on the inner reel 25. The first reflecting part 63 is mounted on the inner reel board 32 and disposed the inside of the inner reel 25 in the same fashion as the lamps 61*a*-61*i*.

The first reflecting part 63 is composed of a bottom plate 63*a* curving in an arc, three side plates 63*b*, 63*c* and 63*d* formed on the three sides of the bottom plate 63*a* except the side connecting to the inner reel board 32, and two dividing plates 63*e* and 63*f* disposed to divide the area surrounded by the side plates 63*b*-63*d* into three equal areas in a direction perpendicular to the inner reel board 32. Thus, the lamps 61*a*-61*i* correspond to three symbols on the inner reel 25 displayed through the display window 3. Since the bottom plate 63*a*, the side plates 63*b*-63*d*, and the dividing plates

63_e_ and 63_f_ are reflectors, the lights emitted from the lamps 61_a_-61_i_ are reflected on the reflectors and guided efficiently to the symbols on the inner reel 25.

The second light-emitting device 62 is disposed in a space between the inner reel 25 and the outer reel 26 and provided with a plurality of lamps 62_a_-62_i_ in the same fashion as the first light-emitting device 61. Those lamps 62_a_-62_i_ are arranged on the inner reel board 32 in an arc along the inner circumference of the outer reel 26 and emit the white light when, for example, the stepping motors are stopped. The second light-emitting device 62 is provided with a second reflecting part 64. The second reflecting part 64 is composed of three side plates 64_b_, 64_c_ and 64_d_ and two dividing plates 64_e_ and 64_f_. That is, the second reflecting part 64 has the same composition as the first reflecting part 63 except for having no bottom plate. Note that each one side of the side plates 64_b_-64_d_ connects to the inner reel board 32.

The lights emitted from the lamps 62_a_-62_i_ are reflected on the side plates 64_b_-64_d_ and the dividing plates 64_e_ and 64_f_ and then guided efficiently to the symbols on the outer reel 26. Since the secondreflecting part 64 has no bottom plate, the light emitted from the first light-emitting device 61 toward the symbols on the inner reel 25 may reach the display window 3 without being blocked by the second reflecting part 64.

Figure 7:
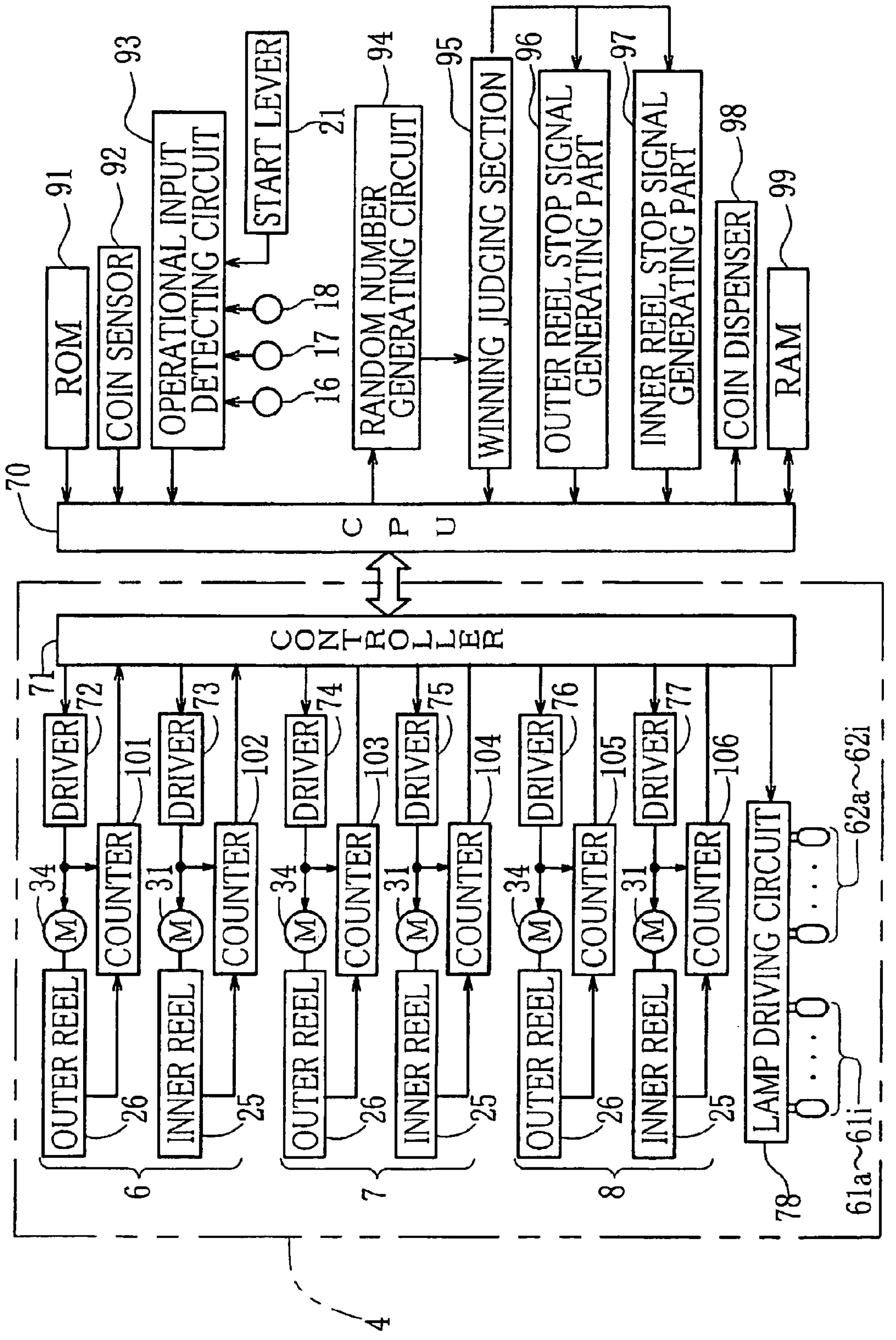
FIG. 7 is a block diagram illustrating an electrical composition of the slot machine.

FIG. 7 is a block diagram illustrating an electrical composition of the slot machine 2. The slot machine 2 is provided with a CPU 70 that controls the entire slot machine 2. The CPU 70 is connected to a controller 71, a controlling means to control each part of the symbol display device 4. The controller 71 is connected to the stepping motors 31 and 34 provided in the first, the second, and the third reel units 6-8, via the motor drivers 72-77 respectively. Based on the number of driving pulses inputted by the motor drivers 72-77, the stepping motors 31 and 34 are rotated by a predetermined stepping angle. The controller 71 is also connected to the lamps 61_a_-61_i_ composing the first light-emitting device 61 and the lamps 62_a_-62_i_ composing the second light-emitting device 62 via a lamp driving circuit 78.

Further, the CPU 70 is also connected to a ROM 91, in which controlling programs for performing the game are stored, a coin sensor 92, an operational input detecting circuit 93, a random number generating circuit 94, a winning judging section 95, an outer reel stop signal generating part 96, an inner reel stop signal generating part 97, a coin dispenser 98, and a RAM 99. The CPU 70 controls them based on the controlling programs stored in the ROM 91. The coin sensor 92 is provided in the back of the coin slot 19 and outputs a coin detecting signal to the CPU 70 when it detects a coin inserted via the coin slot 19.

Note that shielding members (not shown) are provided on reference positions (original positions) of the inner reel 25 and the outer reel 26. When the shielding members shield the light as passing between light-projecting parts and light-receiving parts of photo interrupters (not shown) provided on the outer reel board 35 and the inner reel board 32, the reference positions of the inner reel 25 and the outer reel 26 are detected and reset signals are output to counters (not shown). In response to the reset signals, the counters for counting driving pulses reset the values to "0". That is, the values counted by the counters indicate rotational positions of the inner reel 25 and the outer reel 26 within one round. Since the rotational positions of the inner reel 25 and the outer reel 26 as the counter receives the reset signals are known in advance as well as the arrangements of the symbols on the inner reel 25 and the outer reel 26, the controller 71 may identify the symbols displayed through the display window 3 according to the number of the driving pulses supplied to the stepping motors 31 and 34.

If the win is generated, the CPU 70 stores the data of the number of dividend coins corresponding to the type of the generated win into the RAM 99 with reference to the data of the number of dividend coins stored in ROM 91. When the payout button 18 is operated, the CPU 70 receives a signal from the operational input detecting circuit 93 and controls the coin dispenser 98 to dispense dividend coins onto the coin tray 20 according to the data of the number of dividend coins stored in the RAM 99.

Other than the area to store the data of the number of dividend coins, the RAM 99 also has the areas to store the number of betted coins and the number of inserted coins. In other words, the RAM 99 is a memory to temporarily store various data generated in the game process.

Figure 8:
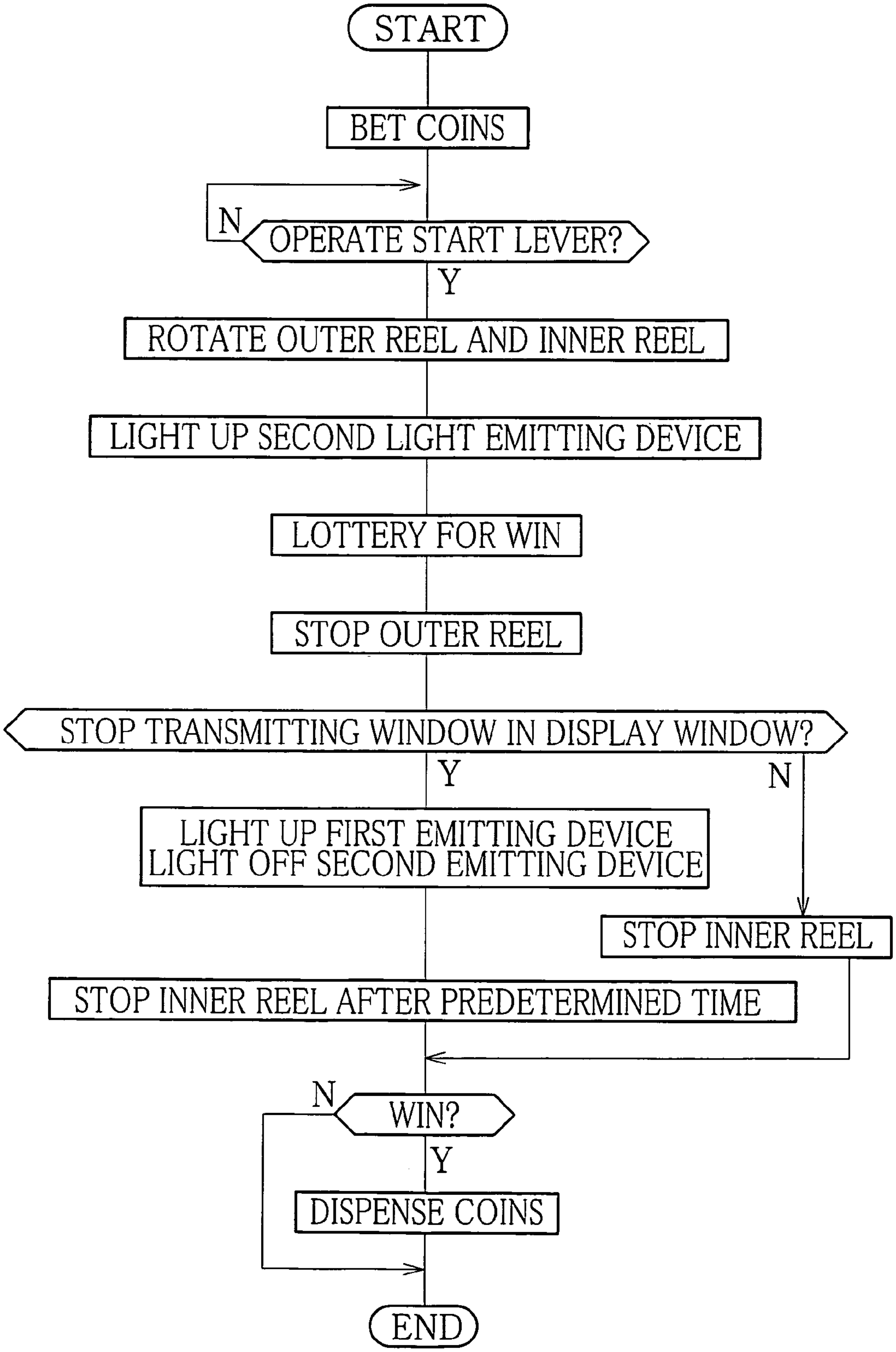
FIG. 8 is a flow chart explaining performance of the slot machine.

Next, performance of the slot machine 2 having a composition stated above is explained with using a flow chart shown in FIG. 8. First, when a player inserts a predetermined number of coins via the coin slot 19 and bets by pressing the 1-bet button 16 or the max bet button 17, some of the prize-winning lines 10-14 are validated. The number of the prize-winning lines to be validated depends on the number of bet. The operational input detecting circuit 93 outputs an operating signal to the CPU 70 when the 1-bet button 16 or the MAX bet button 17 is pressed and outputs a start signal to the CPU 70 when the start lever 11 is operated.

On gaining the start signal from the operational input detecting circuit 93, the CPU 70 outputs a command to the controller 71 to actuate the stepping motors 31 and 34. By controlling the motor drivers 72-77 based on the command, the controller 71 supplies the stepping motors 31 and 34 with driving pulses such that the stepping motors 31 and 34 rotate the inner reel 25 and the outer reel 26. At this point, the controller 71 controls the lamp driving circuit 78 to light up the second light-emitting device 62 such that only the symbols on the outer reel 26 are illuminated. Since the first light-emitting device 61 is turned off and the symbols on the inner reel 25 are not illuminated, neither their colors nor shapes is reflected on the symbols on the outer reel 26.

Furthermore, on gaining the start signal, the CPU 70 controls the random number generating part 94 to sample a single random number and to output the sampled random number to the winning judging section 95. The winning judging section 95 draws winning lots based on the sampled random number to output to the CPU 70 with a signal, which corresponds to the type of the win judged by the winning lots, and the symbols to be displayed on the prize-winning lines 10-12.

After a predetermined duration following the winning judgment by the winning judging section 95, the CPU 70 obtains data of stop positions of the stepping motors 31 and 34 respectively from an inner reel stop signal generating part 97 and an outer reel stop signal generating part 96 so as to display the symbols on the prize-winning lines according to the results of the winning judgment. Based on the data of stop positions, the CPU 70 outputs a stop signal to the controller 71. The controller 71 stops the steeping motors 31 at their stop positions by controlling the motor drivers 72, 74 and 76 based on the stop signal from the CPU 70. Thereby, the outer reels 26 of the first, the second, and the third reel units are stopped from rotating.

If any of the symbol transmission windows 53 on the outer reels 26 of all the reel units 6-8 is not displayed through the display window 3 at this point, the controller 71 stops the inner reels 25 of all of the first, the second and the third reel units 6-8 with leaving the second light-emitting devices 62 of all the reel units 6-8 being lit up and the first light-emitting devices 61 of all the reel units 6-8 being turned off. Since the second light-emitting devices 62 are remained being lit up and the first light-emitting devices 61 are remained being turned off still after all reels are stopped, the symbols on the inner reels are not illuminated in the same way as them while all of the inner reels and outer reels are rotated.

On the other hand, if the symbol transmission window 53 (on the outer reel 26 of the first reel unit 6, for example) is displayed through the display window 3, the controller 71 controls the lamp driving circuit 78 to light up the first light-emitting device 61 of the first reel unit 6 and simultaneously to turn off the second light-emitting device 62 of the first reel unit 6 such that the symbols on the inner reel 25 of the first reel unit 6 are clearly displayed by being illuminated.

Succeedingly, the inner reel 25 of the first reel unit 6 is rotated for a predetermined duration. The inner reel 25 may be rotated slowly in that duration. Then, based on the stop signal from the CPU 70, the controller 71 stops the stepping motor 34 by controlling the motor driver 73, 75 and 77 such that the inner reels 25 are stopped. During this operation, the second light-emitting devices 62 of the second reel unit 7 and the third reel unit 8 are remained being lit up and the first light-emitting devices 61 of the second and the third reel units 7 and 8 are remained being turned off.

If the symbol on the inner reel 25 is displayed through the symbol transmission window 53 on the outer reel 2 when all of the inner reels 25 and the outer reels 26 are stopped, the first light-emitting device 61 is lit up and the second light-emitting device 62 is turned off such that the symbol on the inner reel 25, displayed through the symbol transmission window 53, is displayed clearly. In this case, whether the win or the loss is judged from the combination of the symbol on the inner reel 25 displayed through the symbol transmission window 53 and the symbols on other outer reels.

Figure 9A:
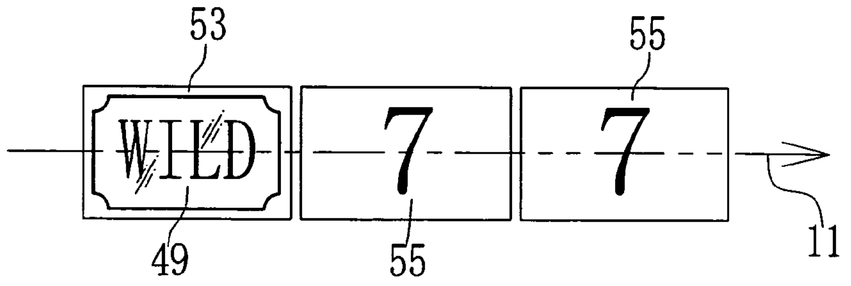
FIG. 9A~9E are explanatory views illustrating examples of winning combinations of the symbols on the outer reels and the inner reels.

For example, as shown in FIG. 9(A), if the symbol transmission window 53 on the outer reel 26 displays the symbol "WILD" 49 on the inner reel 25 through itself and two symbols of "7" 55 on the other outer reels 26 stop together on the prize-winning line 11, it is equivalent to the case of that three symbols of "7" 55 stop together on the prize-winning line 11, and the same number of dividend coins is paid.

Figure 9B:
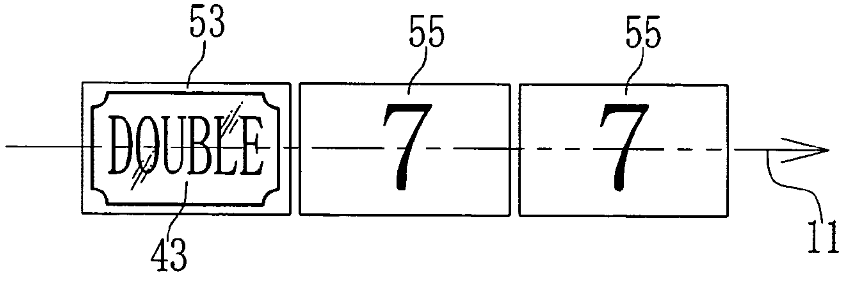

As shown in FIG. 9(B), if the symbol transmission window 53 on the outer reel 26 displays the symbol "DOUBLE" 43 on the inner reel 25 through itself and two symbols of "7" 55 on the other outer reels 26 stop together on the prize-winning line 11, the number of dividend coins to be paid is twice as many as that in the case of three symbols of "7" 55 being stopped together on the prize-winning line 11.

Figure 9C:
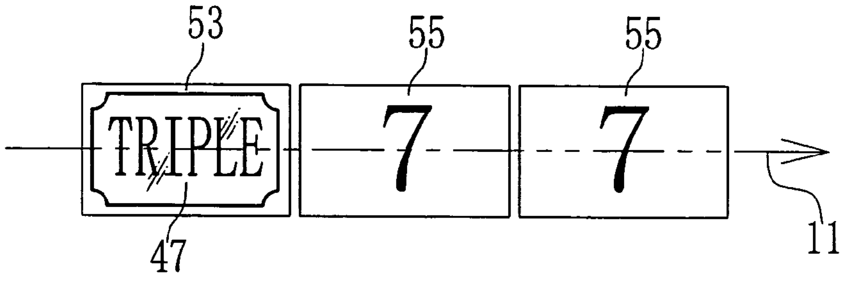

If the symbol transmission window 53 on the outer reel 26, as shown in FIG. 9(C), displays the symbol "TRIPLE" 47 on the inner reel 25 through itself and two symbols of "7" 55 on the other outer reels 26 stop together on the prize-winning line 11, the dividend coins to be paid is triple as many as that in the case of three symbols of "7" 55 being stopped together on the prize-winning line 11.

Figure 9D:
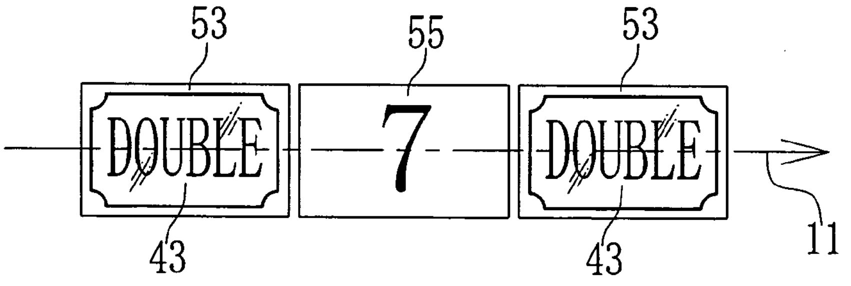

As shown in FIG. 9(D), if two symbol transmission windows 53 respectively display two symbols of "DOUBLE" 43 on the inner reels 25 through themselves and the symbol "7" 55 on the remaining outer reel 26 stop together on the prize-winning line 11, the number of dividend coins to be paid is four times as many as that in the case of three symbols of "7" being stopped together on the prize-winning line 11.

Figure 9E:
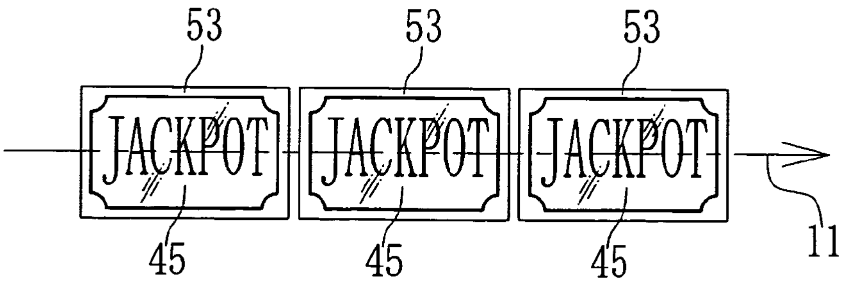

Furthermore, as shown in FIG. 9(E), if three symbols of "JACKPOT" 45 on the inner reels 25 are respectively displayed through three symbol transmission windows 53 on the prize-winning line 11, it indicates jack pot and the maximum number of dividend coins in the game is paid.

Note that though the first and the second light-emitting devices 61 and 62 are provided with the LEDs 61*a*-61*i* and 62*a*-62*i*, and the first and the second reflecting parts 63 and 64 respectively, while they are mounted on the inner reel board 32 in the above embodiment, the first and the second light-emitting devices 61 and 62 are not limited in such compositions but may have the compositions shown in the following embodiments with the same performance and effect as the above embodiment. Note that, in the FIG. 10-15, the same parts as the first reel unit 6 of the above embodiment have identical reference numbers and the detailed explanation for them is omitted.

Figure 10:
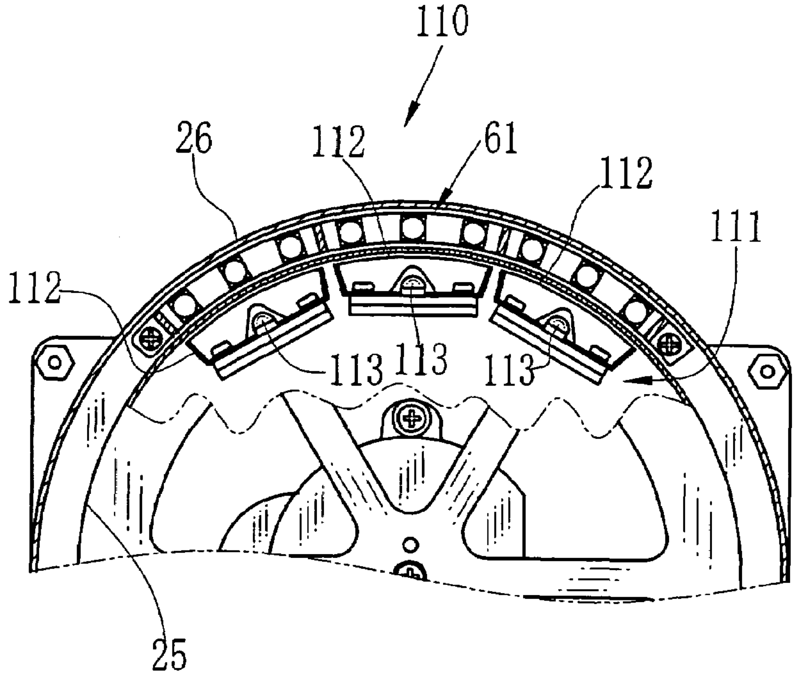
FIG. 10 is a cross-sectional view illustrating a composition of the reel unit having a different composition of the first light-emitting device.
Figure 11:
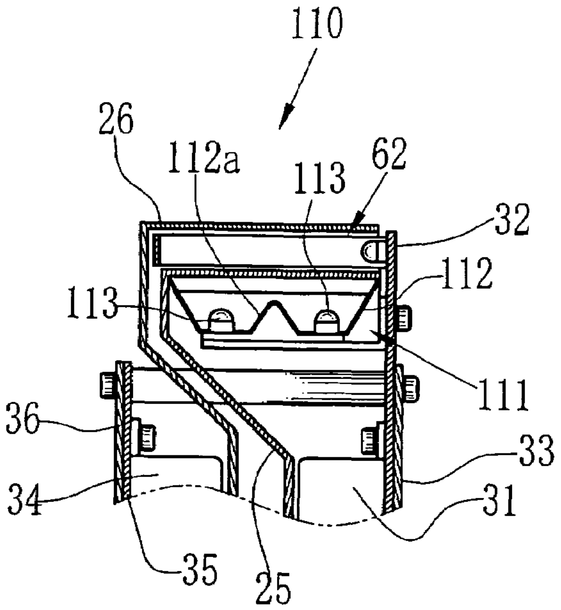
FIG. 11 is a cross-sectional view illustrating a composition of the reel unit having a different composition of the first light-emitting device.

In a reel unit 110 of the second embodiment, as shown in FIG. 10 and FIG. 11, a first light-emitting device 111 is provided with three reflecting parts 112 mounted on the inner reel board 32, and six LEDs each two of which is mounted on the reflecting part 112. Each of the reflecting parts 112 is mounted to face the symbols on the inner reel 25 respectively. In each of the reflecting parts 112, a plurality of reflecting plates surround two LEDs 113 and a protrusion 112*a* is formed in the center. The light emitted from the LEDs 113 is guided efficiently to the symbols on the inner reel 25 by means of the reflecting parts 112.

Figure 12:
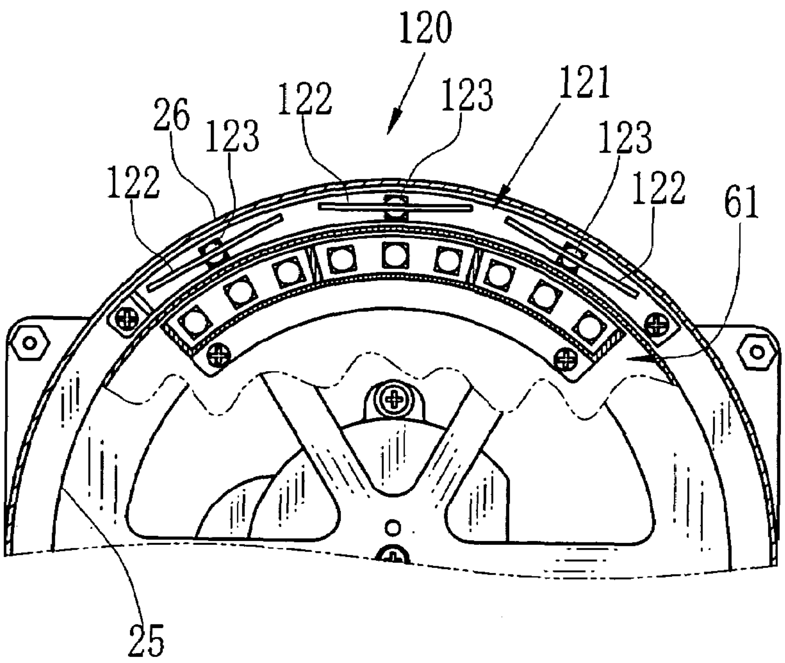
FIG. 12 is a cross-sectional view illustrating a composition of the reel unit having a different composition of the second light-emitting device.
Figure 13:
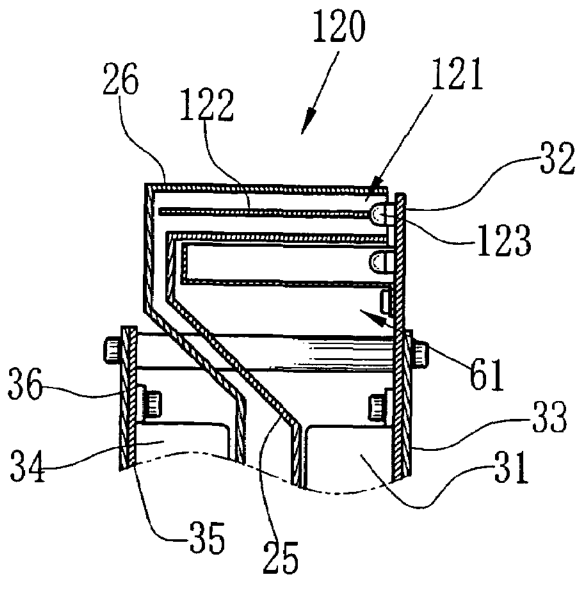
FIG. 13 is a cross-sectional view illustrating a composition of the reel unit having a different composition of the second light-emitting device.

In the third embodiment, as shown in FIG. 12 and FIG. 13, a second light-emitting device 121 in a reel unit 120 is provided with three transparent plastic members, which may be plates 122 instead of the second reflecting part 64. Each of the transparent plastic plates 122 are fixed respectively to the three LEDs 123 mounted on the inner reel board 32 and perform as diffusing plates for reflecting and diffusing broadly the light emitted from the LEDs 123. Thereby, all symbols on the outer reel 26 are illuminated equally. In addition, the light emitted from the first light-emitting device 61 may be transmitted through the transparent plastic plates 122 after illuminating the symbols on the inner reel 25.

Figure 14:
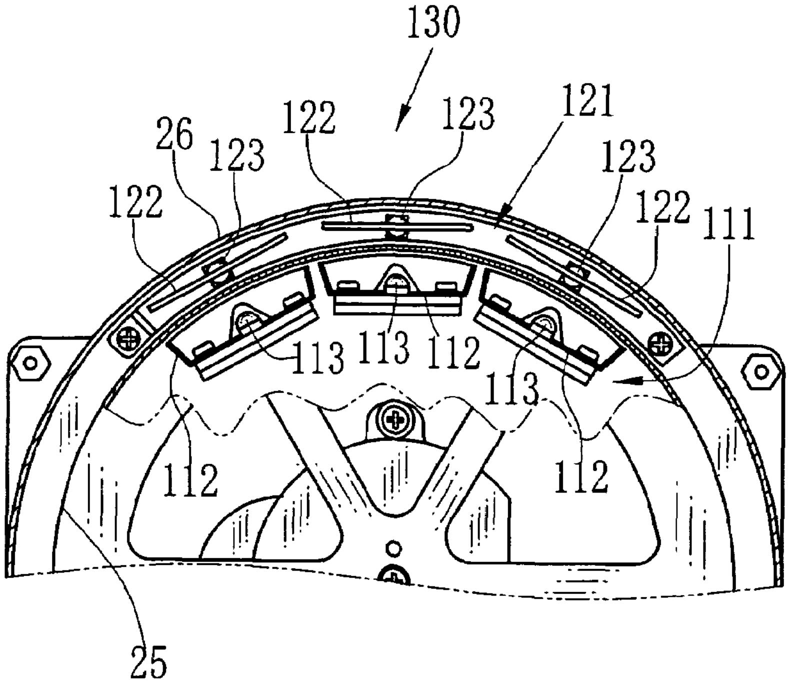
FIG. 14 is a cross-sectional view illustrating a composition of the reel unit having different compositions of the first light-emitting device and the second light-emitting device.
Figure 15:
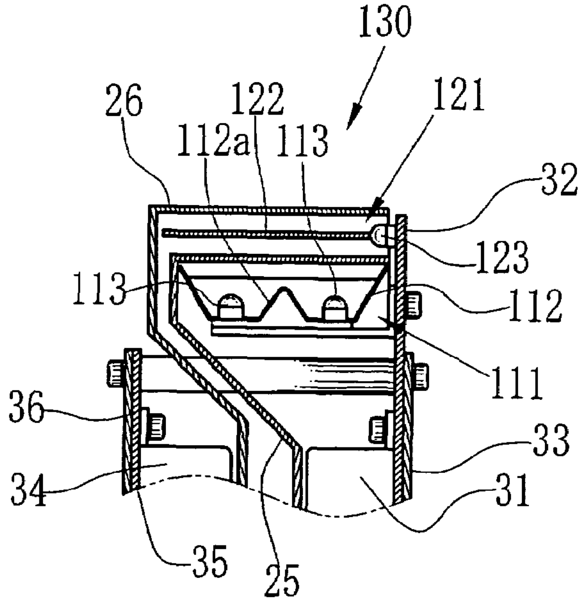
FIG. 15 is a cross-sectional view illustrating a composition of the reel unit having different compositions of the first light-emitting device and the second light-emitting device.

In the fourth embodiment, as shown in FIG. 14 and FIG. 15, a reel unit 130 is provided with the first light-emitting device 111, shown in the second embodiment, and the second light-emitting device 121, shown in the third embodiment.

Though the peripheries of the outer reels are wound with symbol sheets and the entire outer reels are formed to be translucent in the above embodiments, it is also possible to form the outer reels out of transparent plastic material and to print the symbols on the peripheries of the outer reels such that the symbols on the inner reels are observable through the gaps between the symbols on the outer reels. In addition, though the symbol transmission window is colored lightly in the above embodiment, it may be transparent and colorless as well.

Note that, in the above embodiment, though the control means turns off the first light-emitting device and simultaneously lights up the second light-emitting device so as to clearly display the symbols on the outer reel and, to the contrary, lights up the first light-emitting device and simultaneously turns off the second light-emitting device so as to clearly display the symbols on the inner reel, it is not limited in that but the first and the second light-emitting devices may be lit up, flashed or turned off arbitrarily to match with the game process.

Note that the first and the second light-emitting devices emit white light in the above embodiment, it is possible for them to emit light of other colors such as red, for example. Also, it is possible to use the LEDs emitting RGB (red, green and blue) lights so as to illuminate the symbols colorfully with lights of various colors by mixing the RGB. In that case, the colors of the lights to be emitted may be arranged arbitrarily to match with the game process.

Note that though each of the first, the second and the third reel unit composing the symbol display device has double reels in the above embodiment, they may be arranged arbitrarily. For example, it is possible to provide only the first reel unit with two reels.

Note that, in the above embodiment, though the inner reel 25 and the outer reel 26 are respectively connected to the stepping motors 31 and 34, whose output shafts are concentric with each other, and rotate around the respective output shafts, it is also possible to compose rotary shafts of the inner reel and the outer reel to be not concentric with each other. In this case, for example, the inner reel rotates within the radius of the outer reel and is disposed between the display window and the rotary shaft of the outer reel. In addition, the second light-emitting device is disposed on an approximate the same plane with the output shafts of the inner reel and the outer reel, by means of a support member for supporting the second light-emitting device in the space between the peripheries of the inner reel and the outer reel.

Note that though the second reflecting part 64 has the same composition as the first reflecting part 63 except for having no bottom plate in the above embodiment, the second reflecting part 64 may have a bottom plate formed out of translucent material or a bottom plate with a plurality of openings.

Note that, in the above embodiment, though whether the win or the loss is judged from the sampled random number and then each reels are controlled to stop for displaying the symbols corresponding to the result of the judgment, it is also possible that the symbols on the inner reels and the outer reels to be displayed are determined according to the sampled random number and then the symbols on the inner reels and the outer reels are displayed according to the determination and whether the win or the loss is judged from the combinations of the displayed symbols.

Furthermore, note that though the symbol display device for a game machine of the present invention is applied to the slot machine in the above embodiment, the symbol display device for a game machine of the present invention may also be applied to other game machines such as Pachinko game machines, for example.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A symbol display device for a game machine, wherein whether the win or the loss is judged from combinations of symbols displayed on prize-winning lines crossing a display window, said symbol display device comprising:

a plurality of reel unit disposed to cross said prize-winning lines, at least one of said reel unit being a double unit comprising an inner reel and an outer reel, said inner reel and said outer reel being rotatable independently from each other and having transmittance at least in part;

a plurality of inner symbols provided on a periphery of said inner reel, said inner symbols being displayed through said display window via at least a part of a periphery of said outer reel;

a plurality of outer symbols provided on the periphery of said outer reel;

a first light-emitting device disposed inside said inner reel to illuminate said inner symbols;

a second light-emitting device disposed between the inside of said outer reel and the outside of said inner reel to illuminate said outer symbols;

an inner reel board for supporting a first motor;

an inner reel mounting plate for securing said inner reel board;

an outer reel board for supporting a second motor;

an outer reel mounting plate for securing said outer reel board; and a connecting member for connecting said inner reel mounting plate and said outer reel mounting plate, wherein said inner reel is mounted on an output shaft of said first motor and said outer reel is mounted on an output shaft of said second motor, said output shafts of said first motor and said second motor are concentric, wherein said first light-emitting device and said second light-emitting device are mounted on said inner reel board.

2. A symbol display device claimed in claim 1, wherein at least one transparent window is provided on the periphery of said outer reel, said inner symbols are displayed through said display window via said transparent window.

3. A symbol display device claimed in claim 1, wherein said inner reel and said outer reel are formed out of light-transmittable plastic, said symbol display device further comprising:

a translucent inner symbol sheet having said inner symbols printed thereon for being wound about the periphery of said outer reel; and a translucent outer symbol sheet having said outer symbols and a transparent window printed thereon for being wound about the periphery of said outer reel, said inner symbols being displayed through said display window via said transparent window.

4. A symbol display device claimed in claim 3, wherein said outer symbol sheet is provided with a transparent area corresponding to said transparent window and a translucent area having less transmittance than said transparent area, a framing line is printed on the boundary between said transparent area and said translucent area.

5. A symbol display device claimed in claim 1, wherein said first light-emitting device is provided with a plurality of light-emitting elements and a first reflecting part for guiding the light emitted from said light-emitting elements toward said inner symbols.

6. A symbol display device claimed in claim 5, said light-emitting elements are arranged on said inner reel board in an arc along the inner circumference of said inner reel, said first reflecting part comprising:

a bottom plate being curved in an arc along the arrangement of said plural light-emitting elements;

three side plates for surrounding said bottom plate together with said inner reel board;

a plurality of dividing plates for dividing an area defined by said three side plates and said inner reel board into a plurality of areas in a direction perpendicular to said inner reel board, said bottom plate, said side plates, and said dividing plates being reflectors for reflecting the light, each of said plurality of areas facing one of said inner symbols.

7. A symbol display device claimed in claim 1, wherein said second light-emitting device is provided with a plurality of light-emitting elements and a second reflecting part for guiding the light emitted from said light-emitting elements toward said outer symbols.

8. A symbol display device claimed in claim 7, said light-emitting elements are arranged on said inner reel board in an arc along the inner circumference of said outer reel, said second reflecting part comprising:

a bottom plate being curved in an arc along the arrangement of said plural light-emitting elements;

three side plates for surrounding said bottom plate together with said inner reel board;

a plurality of dividing plates for dividing an area defined by said three side plates and said inner reel board into a plurality of areas in a direction perpendicular to said inner reel board, said bottom plate, said side plates, and said dividing plates being reflectors for reflecting the light, each of said plurality of areas facing one of said outer symbols.

9. A symbol display device claimed in claim 1, further comprising a controller for controlling to light up and turn off said first and second light-emitting devices and to rotate and stop said inner reel and said outer reel, said controller turns off said first light-emitting device and lights up said second light-emitting device while rotating said inner reel and said outer reel.

10. A symbol display device claimed in claim 9, wherein said controller stops only said outer reel after rotating said inner reel and said outer reel for a predetermined duration;

wherein said controller, if said transparent window is displayed through said display window when only said outer reel stops, lights up said first light-emitting device and turns off said second light-emitting device while rotating said inner reel for a predetermined duration and then stops said inner reel.

11. A symbol display device claimed in claim 9, wherein said controller stops only said outer reel after rotating said inner reel and said outer reel for a predetermined duration;

wherein said controller, if said transparent window is not displayed through said display window when said outer reel stops, stops said inner reel with leaving said first light-emitting device being turned off and said second light-emitting device being lit up.

12. A symbol display device claimed in claim 5, wherein a plurality of said first reflecting parts are provided with corresponding to the number of said inner symbols to face said display window, said first reflecting part comprising:

a plurality of reflectors for surrounding said light-emitting elements.

13. A symbol display device claimed in claim 1, wherein said second light-emitting device comprising:

a plurality of light-emitting elements mounted on said inner reel board; and an elongate transparent member mounted on each of said light-emitting elements for diffusing the light emitted from said light-emitting elements toward said outer symbols, said transparent member transmitting the light from said first light-emitting device.

* * * * *